R. PAULSON.
TRAP NEST.
APPLICATION FILED AUG. 31, 1916.

1,224,318.

Patented May 1, 1917.
3 SHEETS—SHEET 1.

Inventor:
Rudolf Paulson.
by his atty
Charles S. Gooding

R. PAULSON.
TRAP NEST.
APPLICATION FILED AUG. 31, 1916.

1,224,318.

Patented May 1, 1917.
3 SHEETS—SHEET 2.

Inventor
Rudolf Paulson
by his atty Charles J. Gooding

Inventor:
Rudolf Paulson.
by his atty

UNITED STATES PATENT OFFICE.

RUDOLF PAULSON, OF WAKEFIELD, MASSACHUSETTS, ASSIGNOR OF ONE-HALF TO CARL B. FORELLY, OF FOXBORO, MASSACHUSETTS.

TRAP-NEST.

1,224,318.  Specification of Letters Patent.  Patented May 1, 1917.

Application filed August 31, 1916. Serial No. 117,949.

*To all whom it may concern:*

Be it known that I, RUDOLF PAULSON, a citizen of the United States, residing at Wakefield, in the county of Middlesex and State of Massachusetts, have invented new and useful Improvements in Trap-Nests, of which the following is a specification.

This invention relates to improvements in trap nests and has for its object to provide a simple nest which is constructed and arranged to automatically operate so as to direct a fowl, after she has laid an egg, into a separate pen from that from which she entered the nest, but if no egg has been laid by said fowl to conduct said fowl back to the same pen from which she entered said nest.

Another object of the invention is to provide means for supporting the egg which has just been laid in full view of the fowl until said fowl has passed from the nest.

Still another object of the invention is to provide means adapted to be operated by the fowl upon entering said nest to entirely close the entrance gate so as to prevent more than one fowl from entering said nest at a time, said means being adapted to maintain said gate closed during the entire period when the fowl is on the nest.

Still another object of the invention is to provide means for partially opening one of the exit gates and locking the other when a fowl has deposited an egg in said nest.

The invention consists in the combination and arrangement of parts set forth in the following specification and particularly pointed out in the claims.

Referring to the drawings.

Like numerals refer to like parts throughout the several views of the drawings.

Figure 1:
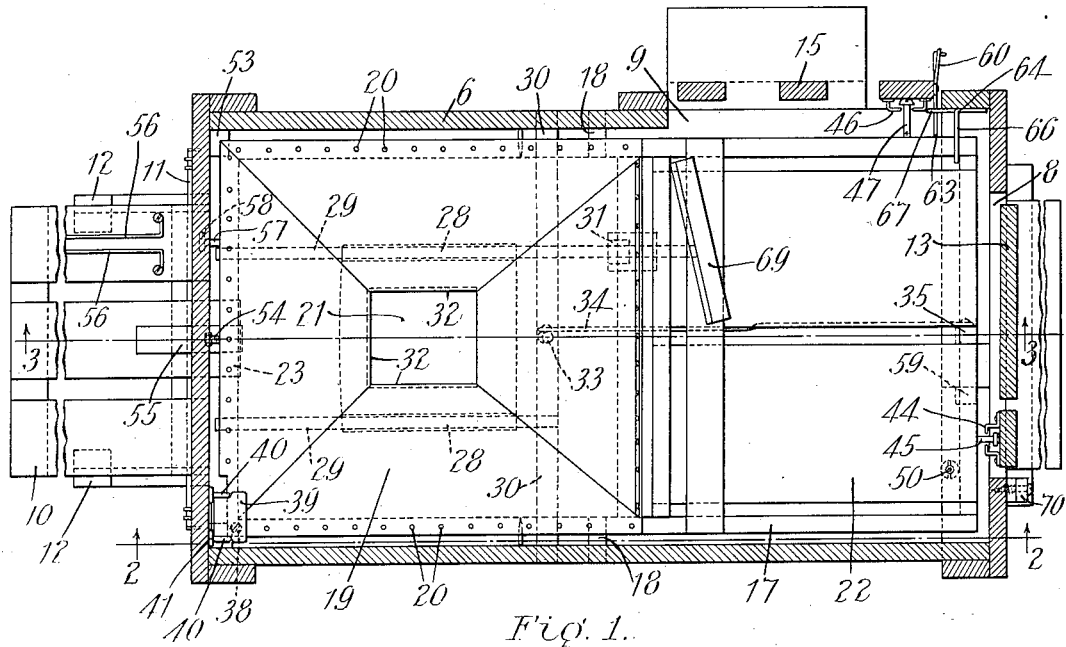
Figure 1 is a plan section with the top removed of a trap nest embodying my invention, parts of said nest being broken away to save space in the drawings.

In the drawings, 6 is a casing preferably constructed in the form of a crate so as to provide plenty of ventilation. The casing 6 is provided with three openings, one of which is arranged in one end of the casing at 7 and constitutes an entrance opening. Another of said openings is arranged at the opposite end of said casing and constitutes an exit opening 8 and the third opening is arranged in one of the side walls of the casing adjacent to the end containing the exit opening 8 and said side opening also constitutes an exit opening 9.

At the entrance opening 7 is arranged a gate 10 pivoted to rock about a rod 11 horizontally disposed adjacent to the lower edge of said gate. The gate 10 is adapted to remain normally open in a substantially horizontal position against stops 12, 12 extending outwardly from the casing 6, said gate also constituting a step or platform on which a fowl may stand previous to its entering the nest.

A gate 13 is pivotally arranged in the opening 8 with the pivot 14 thereof arranged horizontally along the upper edge of said gate. This gate is adapted to normally remain closed. A gate 15 is pivoted within the opening 9 to rock about a horizontal rod 16 arranged along the upper edge of said gate 15 and this gate is also adapted to remain normally closed, the weights of said gates 13 and 15 being disposed with relation to their pivots so as to retain them in their normal position. The openings 7 and 9 preferably communicate with the same yard while the opening 8 communicates with a different yard from that opening into the casing through the openings 7 and 9.

Figure 2:
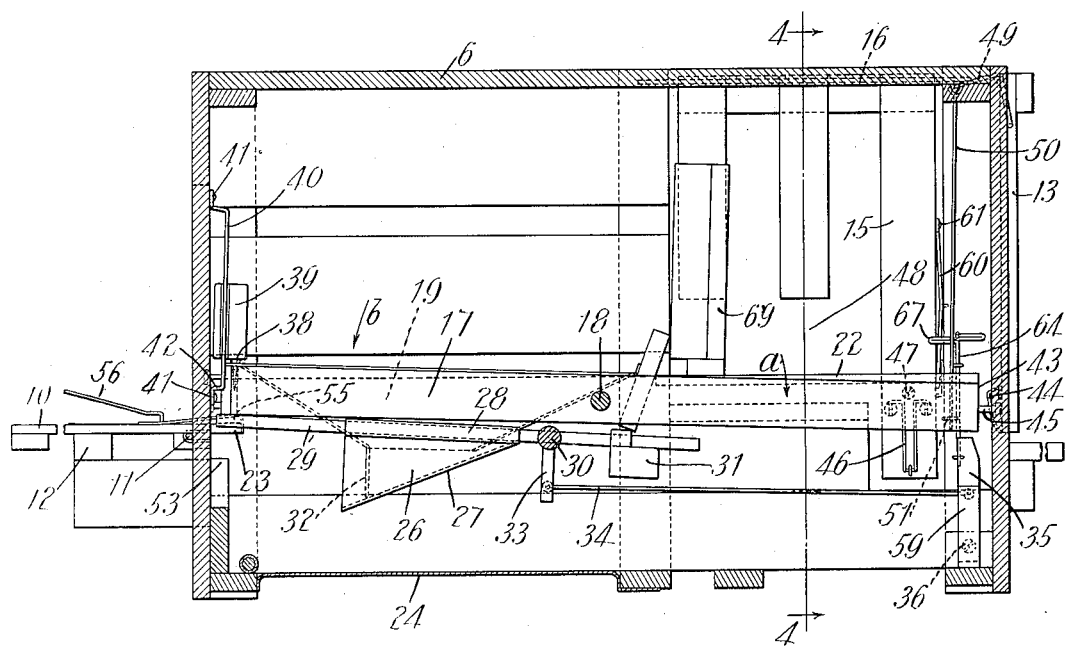
Fig. 2 is a vertical section taken on the line 2—2 of Fig. 1.

A frame 17 is arranged within the casing 6 in a substantially horizontal position, as illustrated in Fig. 2. A shaft 18 extends transversely of the frame 17 substantially midway between the ends thereof, said shaft extending into the sides of the casing 6 to pivotally support said frame within said casing.

A nest 19, constructed of suitable material, preferably canvas, or like material and slightly concaved, is attached to the frame 17 at the end of said frame adjacent to the entrance opening 7, said nest being secured by tacks 20 to said frame. The nest 19 is furthermore disposed at one side of the shaft 18 and has an opening 21 preferably at the bottom and which is also at the center of said nest, of a size sufficient to permit any eggs which may be laid in said nest to pass therethrough.

A portion of the frame 17 upon the opposite side of the shaft 18 from the nest 19, constitutes a platform 22 and this end of said frame is slightly heavier than the opposite end thereof, whereby there will be a constant tendency of said frame to tip downwardly at said end in the direction of the arrow $a$. The gate 10 has a projection 23 thereon which, when said gate is in its horizontal position, will project beneath the end of the frame 17 and thus support said frame in a substantially horizontal position, as illustrated in Figs. 1 and 2.

Beneath the nest 19 is stretched a piece of suitable fabric 24 on which the eggs drop from the nest. An opening 25 is provided in the end of the casing directly beneath the entrance opening, through which the eggs which are deposited upon the fabric may be removed. An egg pocket 26 is provided directly beneath the opening 21. The pocket 26 preferably embodies in its construction a chute 27 constructed of soft material, preferably canvas, which is inclined downwardly toward the opening 25, said canvas having hems 28, 28 formed at opposite edges thereof adapted to receive rods 29 which are preferably parallelly disposed beneath the nest 19. These rods are secured to a cross shaft 30 pivotally arranged in the side walls of the casing 6 and preferably in parallel relation to the shaft 18 and at the rear of the opening 21.

A weight 31 is attached to one of the rods 29 upon the opposite side of the shaft 30 from the chute 27 so as to normally retain the chute 27 in its uppermost position in close proximity to the bottom of the nest 19. Coöperating with the chute 27 to form the egg pocket 26 is a guard 32 extending substantially around three sides of the opening 21 and conforming with the shape of the chute 27 so that when an egg is dropped into the pocket through the opening 21 it will be prevented from rolling down the chute 27 by the guard 32.

An arm 33 extends downwardly from the shaft 30 and is connected at its lower end with a rod or link 34 extending toward the rear of the casing 6 where it is pivotally attached at its rear end to a stop 35 pivoted at 36 to the lower portion of the casing 6. The upper end 37 of said stop is arranged directly beneath the rear edge of the frame 17 and is arranged to normally prevent the tipping of said frame in the direction of the arrow $a$ from the position occupied by said frame illustrated in Fig. 2.

The forward end of the frame 17 which rests upon the projection 23 is provided with an adjusting screw 38 which engages the under side of a weight 39 constructed and arranged to slide vertically within the casing 6 between vertical guide rods 40, 40 which are bent at their upper and lower ends to form eyes 41 by means of which said rods may be attached to the casing. The bent portions 42 at the lower end of the rods 40 are arranged at predetermined distances above the pivot 11 of the gate 10 and constitute stops for the weight 39 to prevent said weight from dropping below a predetermined point.

When the rear end of the frame 17 is resting upon the projection 23 of said gate, the weight 39 is lifted a slight distance above the stops 42 by reason of the weight of the gate 10 being heavier than the weight 30. Between said gate 10 and said weight 39 the frame will be maintained in a fairly rigid condition in the position shown in Figs. 1 and 2.

The gate 13 has secured to the lower end thereof in a position opposite to the rear end 43 of the frame 17, that is when said frame is in the position indicated in Fig. 2, a pair of parallelly disposed members 44 placed at a slight distance apart and at a distance from the inner face of said gate, said parallel members being preferably formed from a single piece of wire which is secured to said gate.

Coöperating with said parallel members is a member preferably consisting of a screw 45 which projects outwardly from the end of the frame 17 toward said gate. The head of said screw is wider than the space between the parallel members 44 and is adapted to normally rest between said parallel members and the gate portion to which said members are secured, said screw and said parallel members constituting means adapted to normally prevent the opening of said exit gate 13.

The gate 15 is also provided with a pair of parallel members 46 similar to the members 44 just described. A screw or other suitable means 47 projects laterally from the frame 17 with its head engaging said gate 15. The screw 47 is, however, arranged slightly above the parallel members 46 and with the frame in its normal position said screw will not engage said parallel members but will lie above said members, although any tilting of the end of said frame bearing said screw 47 downwardly in the direction of the arrow $a$ will cause the screw 47 to enter the space between the parallel members 46 which are placed at a distance from the face of the gate, and thereby interlock with said parallel members and prevent the gate 15 from being swung outwardly.

The gate 15, however, is normally free to be swung outwardly upon its pivot, the lower part of said gate being cut away to provide an opening 48 through which a fowl will naturally insert its head when attempting to leave the casing. The gate 13 has at its upper end an arm 49 which projects into the casing 6 and is connected at its inner end by means of a link 50 with the rear end 43 of said frame, said link 50 projecting through the platform 22 and a substantial distance hereneath and has at its lower end a collar 51 which is engaged by the platform 22 when said frame has been tilted a predetermined distance or a distance sufficient to free the head of the screw 45 from the parallel members 44, whereupon a continued movement of said frame downwardly will cause the gate 13 to be partially opened, as illustrated in Fig. 5, the purpose of which will be hereinafter more fully set forth.

The frame 17 is adapted to be tipped in the direction of the arrow $b$ when a fowl enters the nest 19 through the entrance opening, her weight being sufficient to carry the end of said frame bearing said nest downwardly until the forward end 52 of said frame comes in contact with stops 53 which stops support said nest while the fowl is laying her egg. During the downward movement of the end 52 of said frame a projecting member 54 is arranged to engage an inclined or wedge-shaped member 55 attached to the upper face of the projection 23, said projecting member and inclined member coöperating together to close the gate 10.

The position of the pivot 11 of the gate 10 is such that after said gate has once been closed it will remain closed and thereby exclude other fowls from the nest. The downward movement of said frame in the direction of the arrow $b$ also permits the weight 39 to move against the stops 42 in which position said weight will remain until the frame is moved upwardly, as hereinafter set forth.

Figure 3:
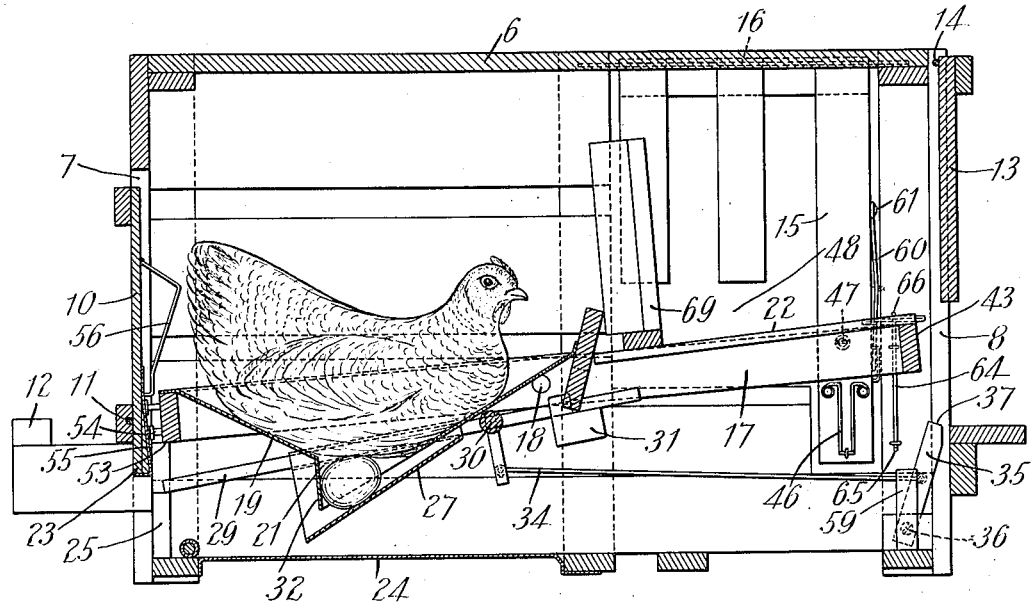
Fig. 3 is a section taken on the line 3—3 of Fig. 1, illustrating a fowl on the nest and an egg deposited in the egg pocket beneath said fowl.
Figure 5:
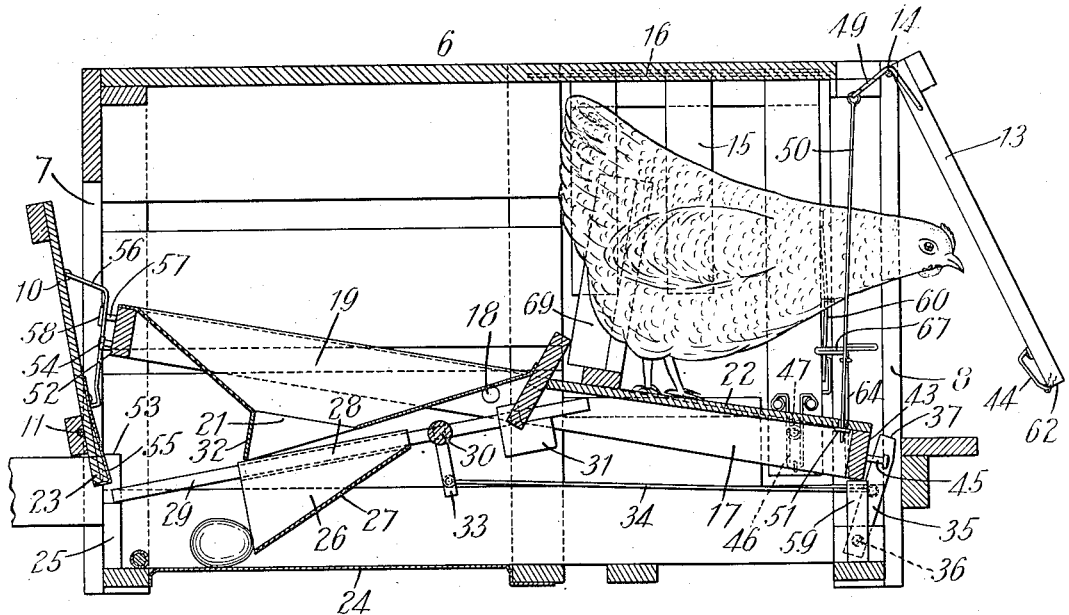
Fig. 5 is a section similar to Fig. 3 with the parts shown in the positions which they occupy when a fowl is approaching the exit opening of said nest after having laid an egg.

Secured to the inner face of the gate 10 are parallel members 56, 56, said members being arranged to be inclined inwardly and upwardly with respect to said gate when said gate is in its upright position, as will be seen by referring to Figs. 3 and 5. A projecting member, preferably a screw 57, is attached to the forward end of the frame 17 in alinement with the parallel members 56 so that at certain times during the operation of the frame the head 58 of said screw 57 will interlock with said parallel members and thus prevent the opening of the gate 10 in substantially the same manner as hereinbefore described with relation to the locking of the gates 13 and 15.

When the fowl desires to leave the nest she must pass toward the rear end of the casing on to the platform 22. This throws her weight upon the opposite side of the shaft 18, consequently moving the frame in the opposite direction, as indicated by the arrow $a$ or at least it has a tendency to move said frame in this direction. If an egg has been laid by the fowl and dropped into the egg pocket 26 the weight of said egg depresses the chute 27 and through the rod 29, shaft 30, arm 33 and link 34 transmits motion to the stop 35 to trip said stop, thus permitting the frame to move unrestricted with one exception to the end of its throw.

The movement of said frame, however, in this direction is limited by a stop 59 arranged beneath said gate and adjacent to the stop 35. When the stop 35 is removed from beneath the rear end 43 of the frame 17 and said frame moves in the direction of the arrow $a$ the screw 45 will be disengaged from the members 44, thus releasing the gate 13. A further downward movement of said frame causes the platform 22 to engage the collar 51 and thereby swing the gate 13 outwardly into the position shown in Fig. 5, providing an opening through which the fowl may pass outwardly from the casing 6.

When the fowl is sitting upon the nest 19 and the frame 17 is tilted as shown in Fig. 3 and the gate 10 is closed the screw 57 will be in a position directly beneath the lower end of the parallel members 56 and adjacent to the lower end of the opening between said members consequently when said frame is moved in the opposite direction by reason of the fowl passing to the platform 22 the head 58 of the screw 57 will pass upwardly between the parallel members 56 and the adjacent face of the gate 10 engaging said parallel members.

Furthermore, by reason of the inclination of the members 56 the end 52 of said frame will engage said members and force said gate outwardly a slight distance sufficient to move the center of gravity of said gate to the outer side of the pivot 11 in which position it is held by the screw 57 interlocking with the parallel members 56.

The relation of the screw 57 to the lower ends of the members 56 is such that when the weight 39 reaches the stops 42 said screw will be disengaged from said members and thus permit the gate to return to its horizontal position, as illustrated in Figs. 1 and 2. The weight of the fowl, however, on the platform 22 prevents the weight 39 from returning to its lowermost position.

It is not an uncommon thing in a nest of this nature for the fowl, after having stepped upon the platform 22, to decide to return to the nest 19 and as they usually move very slowly, when she reaches the position directly above the shaft 18 the weight 39 will have a tendency to return to its lowermost position against the stop 42. Should this be permitted, the gate 10 would be released and thus permit it to fall to its horizontal position, permitting another fowl to enter the nest before the fowl therein has had a chance to escape, with the result that the frame will not operate properly to accomplish its several functions.

Figure 6:
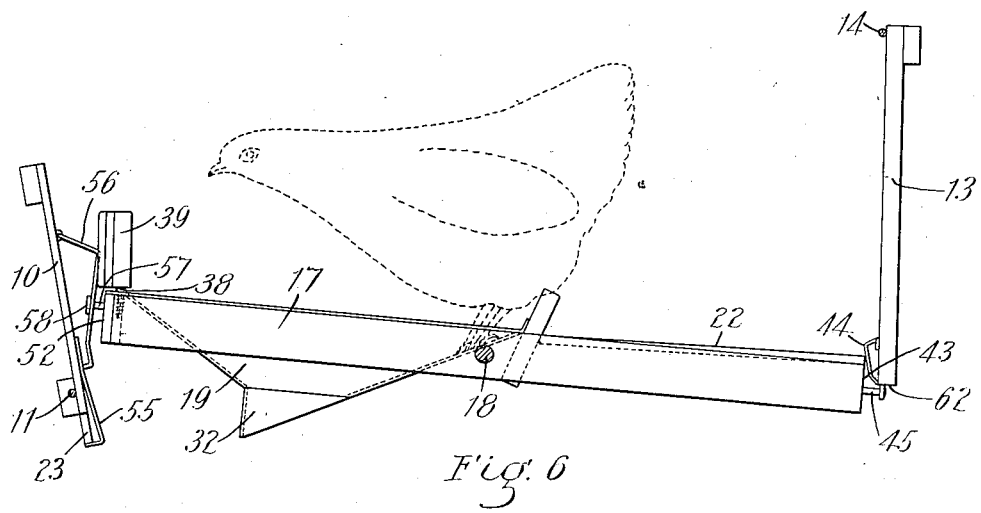
Fig. 6 is a detail view of the pivoted frame and gates adjacent opposite ends thereof, said frame being shown tilted and held in such a position by the exit gate.

To prevent such from happening, the screw 45 is made long enough to project beneath the lower end 62 of the gate 13 which is only partially opened during the downward movement of the rear end 43 of said frame and will, if not opened to full extent by the fowl passing through said opening, return quickly to its closed position as the frame 17 starts to rock in the direction of the arrow b, whereupon said screw 45 will, as stated, engage the lower end 62 of said gate 13 and thereby prevent the weight 39 from moving to its lowermost position, see Fig. 6.

The screw 57 will not, therefore, be disengaged from the members 56 to permit said gate 10 to fall to its lowermost position, but instead said gate will be held closed and remain so closed until the fowl has passed outwardly through the opening 8 at the rear of the casing.

If an egg is not laid by the fowl on the nest 19 and said fowl attempts to leave the casing passing on to the platform 22 the stop 35 will not be tripped, consequently the frame 8 will not be permitted to move in the direction of the arrow a to its lowermost position but will be stopped by the stop 35. When in this position, said frame will still retain the gate 13 closed by reason of the screw 45 engaging the members 44 but the screw 47 will not at this time have been moved between the members 46 so that the gate 15 will be free to be opened by the fowl.

There is provided a slight clearance between the upper end of the stop 37 and the bottom of the frame 17 so that said frame may be slightly rocked in the direction of the arrow a before the same contacts with the stop.

Figure 4:
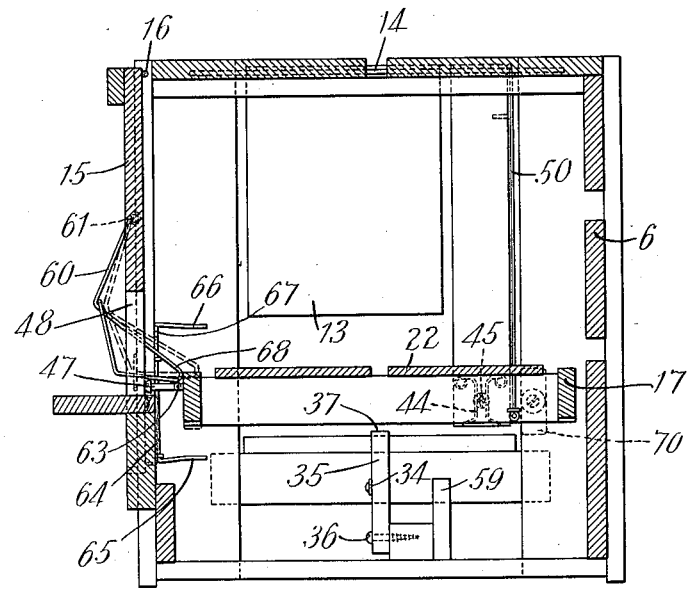
Fig. 4 is a transverse section of the nest taken on the line 4—4 of Fig. 1.

Attached to the gate 15 is a stop member 60 pivoted at 61 on one side of said gate and arranged with its lower end 63 projecting between said gate and the side of the opening 9 into engagement with the side of the frame 17 adjacent to the upper edge thereof when the frame is in its normal position, as illustrated in Figs. 2 and 4.

When the fowl steps upon the platform 22 and moves the same downwardly in the direction of the arrow a against the upper end of the stop 35 sufficient movement of said frame takes place to release the end 63 of said stop and permits the same to be moved into the position illustrated in dotted lines, Fig. 4, this being accomplished by reason of the fact that the center of gravity of said stop is normally disposed outside of the gate. Thus when the interference, due to the frame 17 being in the path of said stop, is removed, said stop will swing inwardly as shown.

With the stop 63 in this position it will be impossible for the fowl, by returning to the nest, to rock the frame 17 in the direction of the arrow b under the action of the weight 39 or by the weight of the fowl thereon so as to release the gate 10 but rather said gate will be retained in its closed position, preventing the entrance of another fowl into the casing until the fowl therein has made its exit through the opening 9.

When the fowl finally passes from the casing through the exit opening 9 the gate 15 will be swung outwardly carrying with it the stop member 60, thereby withdrawing the end 63 thereof from above the frame 17 permitting said frame to swing upwardly to its normal position, as illustrated in Fig. 2, whereupon said gate 10 will be released and permitted to drop to its normal position.

If an egg has been laid by the fowl in the nest and said fowl then moves on to the platform 22, as hereinbefore described, the stop 35 will be tripped, permitting said frame to move downwardly until it engages the stop 59. This action on the frame opens the gate 13 and if the fowl so desires she may pass from the casing through the opening made by said gate. The downward movement of said frame, as indicated, releases the stop member 60 and permits the end 63 to move into a position above said frame, as indicated by the dotted lines hereinbefore referred to.

Should said stop be permitted to remain in this dotted position the frame 17, in returning to its normal position after the fowl has stepped therefrom, will be stopped by the stop member 60 and any subsequent movement of said frame in the direction of the arrow b would be prevented, consequently, it is necessary to withdraw said stop member from its position above said frame before said frame is permitted to return.

To accomplish this result a slide 64 is provided within the casing adjacent to the gate 15, said slide being provided with two arms 65 and 66 projecting toward said frame 17 above and below the end 43 thereof. Another arm 67 is also provided on said slide to project over an inclined portion 68 on the stop 60. As the end 43 of the frame 17 moves downwardly, it engages the arm 65 moving said slide downwardly and causing the arm 67 to engage the inclined portion 68 of said stop so as to retract the end 63 of said stop from the path of the frame 17, thus permitting the frame to return to its normal position without resistance.

In order that the stop 60 may be free to operate the next time a fowl enters said casing, it is necessary to remove the arm 67 from engagement thereof but not until after the frame has returned to its normal position. To accomplish this result the arm 66 hereinbefore referred to has been provided. This arm is adapted to be engaged by the rear end 43 of the frame when said frame is tilted in the direction of the arrow $b$ or, in other words, when a fowl enters the nest to lay an egg.

When a fowl is sitting on the nest 19 with her head toward the exit openings it is necessary to prevent her from sticking her head through the opening 48 beneath the gate 15 for if such were permitted said gate might accidentally be swung outwardly so as to prevent the head of the screw 47 from engaging the members 46 when the frame is subsequently tilted by the fowl as she passes from the nest to the platform 22.

This will permit her to pass outwardly through the gate 15 even though an egg has been laid. Therefore, to prevent this accident from occurring a partition 69 is arranged upon the frame 17 extending part way across said frame on the side thereof adjacent to the gate 15.

The general operation of the device hereinbefore specifically described is as follows:

Assuming the parts to be in the positions illustrated in Figs. 1 and 2 and two pens are provided for the fowl, one of which communicates with the openings 7 and 9 and the other pen communicating with the opening 8 and a fowl steps upon the gate 10, enters the opening 7 and steps upon the nest 19 the weight of the fowl causes the end of the frame 17 bearing said nest to be depressed and to remain so depressed during the time said fowl is on the nest.

During the depression of the nest end of said frame the gate 10 is closed, as hereinbefore described, thus shutting the fowl in the nest and preventing any other fowls from entering. If the fowl on the nest lays an egg, the egg is permitted to drop through the opening 21 into the pocket 26 where it is held in a position in full view of the fowl.

The weight of the egg tilts the chute 27, thereby rocking the arm 33 and transmitting through the link 34 a rocking motion to the stop 35, moving said stop to the position illustrated in Fig. 3, in which position it is held by said egg until the fowl passes from the nest end of the frame 17 on to the platform 22 which she must do to get out of the casing, for the reason that the gate 10 is closed and held by the frame 17.

When the fowl steps upon the platform 22 the frame 17, together with said platform, is depressed in the direction of the arrow $a$, Fig. 2, this being permitted by reason of the fact that the stop 35 has been tripped by the weight of the egg.

The depression of said platform partially opens the gate 13, as illustrated in Fig. 5, permitting the fowl to start from the casing through the opening provided by said partial opening of the gate 13. As she squeezes through said opening the gate 13 will be opened wide and as soon as said fowl has stepped from the platform 22 said platform will be returned to its normal position by means of the weight 29 engaging the frame 17 upon the opposite side of the shaft 18.

If the fowl has not laid an egg and the stop 35 has not been tripped the platform 22 will be prevented from being depressed, consequently the instrumentalities hereinbefore specifically described, will prevent the gate 13 from being opened. The gate 15, however, will be unlocked at this time as this is only locked when the platform 22 is depressed. This permits the fowl to pass outwardly through the gate 15 into the same pen from which she entered the casing, whereas if she had laid an egg she would have been permitted to pass, as stated, through the gate 13 and into the pen communicating with the casing through the opening 8 and thus it may readily be determined which fowls have laid eggs and which have not.

The instrumentalities hereinbefore described automatically control the several gates and the frame 17 so as to absolutely prevent more than one fowl entering the casing at one time.

It is sometimes desirable to set the nest so that a fowl may enter the same and lay her egg and then be confined therein until the attendant releases it, permitting the attendant to inspect the egg from each fowl.

To accomplish this feature, a locking device, preferably embodying a button 70 is pivotally secured to the rear end of the casing adjacent to the side of the gate 13. This button is adapted to be rotated so as to overlap a portion of said gate 13 and thereby prevent the same from being opened when a fowl steps upon the platform 22. The platform will at this time be depressed in the direction of the arrow $a$ until it strikes the collar 51 and a further movement thereof in said direction will be prevented.

The movement of said frame, together with the platform 22 at this time, is, however, sufficient to cause the screw 47 to pass between the members 46 and the head of the screw engages said members so that when the fowl attempts to open the gate 15 it will be prevented from doing so by reason of said screw and said members 46.

Having thus specifically described my invention what I claim and desire by Letters Patent to secure is:

1. A trap nest comprising a casing, an entrance gate therefor, an exit gate, a frame pivotally arranged within said casing, means operated by the rocking of said frame in one direction to close said entrance gate, and means operated by the movement of said frame in the opposite direction to open said exit.

2. A trap nest comprising a casing, a normally open entrance gate therefor, a normally closed exit gate for said casing, a substantially horizontal frame pivoted within said casing adapted to be moved downwardly by the weight of a fowl entering said nest and upwardly when said fowl has left said nest, means operated by the movement of said frame downward from the horizontal position thereof to close said entrance gate, and means operated by the movement of said frame upwardly from the horizontal position thereof to partially open said exit gate.

3. A trap nest comprising a casing, a normally open entrance gate therefor, a normally closed exit gate for said casing, a substantially horizontal frame pivoted within said casing, a nest arranged at one end of said frame adapted to be depressed by the weight of a fowl on said nest, means operated by the depression of said nest adapted to close said entrance gate, a platform arranged adjacent to the opposite end of said frame adapted to be depressed by the weight of a fowl thereon, and means operated by the depression of said platform adapted to partially open said exit gate.

4. A trap nest comprising a casing, a normally open entrance gate therefor, a normally closed exit gate for said casing, a substantially horizontal frame pivoted within said casing, a nest arranged at one end of said frame adapted to be depressed by the weight of the fowl on said nest, means operated by the depression of said nest adapted to close said entrance gate, a platform arranged adjacent to the opposite end of said frame adapted to be depressed by the weight of a fowl thereon, means operated by the depression of said platform adapted to partially open said exit gate, means also operated by the depression of said platform adapted to partially open said entrance gate, means adapted to hold said entrance gate partially open while said platform remains depressed, means adapted to return said platform to its normal position, a weight disposed above the nest end of said frame adapted to be lifted when said platform is depressed by the weight of a fowl thereon, said weight being arranged to return said frame to its normal position when the weight of the fowl is removed from said platform, and means to limit the downward movement of said weight substantially beyond the normal position of said frame.

5. A trap nest comprising a casing, a normally open entrance gate therefor, a normally closed exit gate for said casing, a substantially horizontal frame pivoted within said casing, a nest arranged at one end of said frame adapted to be depressed by the weight of the fowl on said nest, means operated by the depression of said nest adapted to close said entrance gate, a platform arranged adjacent to the opposite end of said frame adapted to be depressed by the weight of a fowl thereon, means operated by the depression of said platform adapted to partially open said exit gate, means also operated by the depression of said platform adapted to partially open said entrance gate, means adapted to hold said entrance gate partially open while said platform remains depressed, and a weight adapted to return said platform to its normal position.

6. A trap nest comprising a casing, a normally open entrance gate therefor, a normally closed exit gate for said casing, a substantially horizontal frame pivoted to rock about a horizontal axis disposed transversely of the central portion of said frame, a nest arranged on said frame at one side of said axis adapted to be depressed by the weight of a fowl, a platform arranged upon said frame at the opposite side of said axis from said nest, said platform also adapted to be depressed by the weight of a fowl, means operated by the depression of the nest end of said frame adapted to close said entrance gate, means operated by the depression of the platform end of said frame, adapted to close said entrance gate, means partly on said frame and partly on said entrance gate adapted to retain said entrance gate in its partially open position while said platform remains depressed, means also operated by the depression of the platform end of said frame to partially open said exit gate, and means adapted to return said frame to its normal position, whereby said entrance gate will be permitted to open and said exit gate will be permitted to close.

7. A trap nest comprising a casing, a normally open entrance gate therefor, a normally closed exit gate for said casing, a substantially horizontal frame pivoted to rock about a horizontal axis disposed transversely of the central portion of said frame, means partly on said frame and partly on said exit gate adapted to lock said exit gate closed while said frame remains in its normal position, a nest arranged on said frame at one side of said axis adapted to be depressed by the weight of a fowl, a platform arranged upon said frame at the opposite side of said axis from said nest, said platform also adapted to be depressed by the weight of a fowl, means operated by the depression of the nest end of said frame adapted to close said entrance gate, means operated by the depression of the platform end of said frame adapted to partially open said entrance gate, means partly on said frame and partly on said entrance gate adapted to retain said entrance gate in its partially open position while said platform remains depressed, means also operated by the depression of the platform end of said frame to partially open said exit gate, and means adapted to return said frame to its normal position, whereby said entrance gate will be permitted to open and said exit gate will be permitted to close.

8. A trap nest comprising a casing, a substantially horizontally disposed frame pivoted within said casing to rock about a horizontal axis disposed transversely of the central portion of said frame, a nest arranged upon one side of said axis adapted to be depressed by the weight of a fowl thereon, a platform arranged upon the opposite side of said axis adapted to be depressed by the weight of a fowl on said platform, an entrance gate for said casing disposed adjacent to the nest end of said frame, two exit gates for said casing disposed adjacent to the platform end of said frame, means operated by the depression of the nest end of said frame adapted to close said entrance gate, and instrumentalities operated by the depression of the platform end of said frame adapted to lock one of said exit gates and said entrance gate closed and to unlock the other of said exit gates.

9. A trap nest comprising a casing, a substantially horizontally disposed frame pivoted within said casing to rock about a horizontal axis disposed transversely of the central portion of said frame, a nest arranged upon one side of said axis adapted to be depressed by the weight of a fowl thereon, a platform arranged upon the opposite side of said axis adapted to be depressed by the weight of a fowl on said platform, a normally open entrance gate for said casing disposed adjacent to the nest end of said frame, means on said frame adapted to be operated by the depression of said nest end thereof to close said entrance gate, a movable stop disposed beneath the platform end of said frame and normally adapted to prevent the depression of said platform, an exit gate for said casing arranged adjacent to the platform end of said frame, means carried in part by said frame adapted to lock said exit gate closed when said frame is in its normal position, a second exit gate for said casing disposed adjacent to the platform end of said frame, means carried in part by said frame adapted to lock said second exit gate closed when the platform end of said frame is depressed, said gate being normally unlocked, and means operated by the weight of an egg in said nest adapted to trip said stop, whereby the platform end of said frame may be depressed.

10. A trap nest comprising a casing, a substantially horizontally disposed frame pivoted within said casing to rock about a horizontal axis disposed transversely of the central portion of said frame, a platform arranged on said frame at one side of said axis, a pair of normally closed exit gates for said casing arranged adjacent to the platform end of said frame, means carried in part by said frame adapted to lock one of said exit gates closed when said platform is in its normal position and to unlock said gate when said platform is depressed, means also carried in part by said frame adapted to lock the other of said exit gates closed when said platform is depressed and to leave said gate unlocked when said platform is in its normal position, a nest arranged adjacent to the opposite end of said frame from said platform, an entrance gate for said casing adjacent to said nest adapted to be automatically closed by the depression of said nest, a stop adapted to normally prevent the depression of said platform, and means constructed and arranged to be operated by an egg dropped into said nest to trip said stop and permit said platform to be depressed.

11. A trap nest comprising a casing, a normally open entrance gate pivotally arranged at one end of said casing, a normally closed exit gate pivotally arranged adjacent to the opposite end of said casing, a second normally closed exit gate arranged in one side of said casing adjacent to the first named exit gate, a nest pivotally arranged in said casing adjacent to said entrance gate adapted to be depressed by the weight of a fowl therein, means operated by the depression of said nest adapted to close said entrance gate, a platform pivotally mounted within said casing adjacent to said exit gates, said platform being normally substantially in alinement with said nest and adapted to be depressed by the weight of a fowl passing from said nest to said exit gates, a stop adapted to normally prevent the depression of said platform by said fowl, means for locking the first mentioned exit gate when said platform is in its normal position, an egg pocket arranged beneath said nest adapted to be moved by the weight of an egg to trip said stop and permit the depression of said platform, and means operated by the depression of said platform adapted to lock said second named gate closed.

12. A trap nest comprising a casing, a normally open entrance gate for said casing, a normally closed exit gate for said casing, a nest pivoted within said casing adapted to normally rest in a substantially horizontal position, said nest being constructed and arranged to be moved downwardly and upwardly by the entering of a fowl into and the passing of said fowl from said nest respectively, means operatively connecting said nest with said entrance gate adapted to close said entrance gate when said nest is moved downwardly, means operatively connecting said nest with said exit gate adapted to open said exit gate during the upward movement of said nest, and means adapted to prevent the opening of said exit gate when said nest is moved upward.

13. A trap nest comprising a casing, a normally open entrance gate for said casing, a normally closed exit gate for said casing, a frame arranged within said casing, a pivot for said frame arranged horizontal transversely of the central portion of said frame, a nest arranged upon said frame adjacent to said entrance gate, means constructed and arranged to normally maintain said frame substantially horizontal, said nest being arranged to be depressed by the weight of a fowl therein, means operatively connecting said frame with said entrance gate adapted to close said gate when said nest is depressed, said frame being adapted to be rocked to elevate said nest when the fowl attempts to leave said nest, coöperating means on said frame and said entrance gate adapted to interlock when said nest is elevated to retain said entrance gate partially closed, means adapted to return said nest to its normal position after the fowl has left said casing, whereby said entrance gate will be permitted to return to its normal position, and means constructed and arranged to prevent said nest from returning to its normal position from its elevated position until after the fowl has passed from said casing.

14. A trap nest comprising a casing, a substantially horizontally disposed frame pivoted within said casing to rock about a horizontal axis disposed transversely of the central portion of said frame, a nest arranged upon one side of said axis adapted to be depressed by the weight of a fowl thereon, a platform arranged upon the opposite side of said axis adapted to be depressed by the weight of a fowl on said platform, a normally open entrance gate for said casing disposed adjacent to the nest end of said frame, means on said frame adapted to be operated by the depression of said nest end to close said entrance gate, a movable stop disposed beneath the platform end of said frame and normally adapted to prevent the depression of said platform, an exit gate for said casing arranged adjacent to the platform end of said frame, means carried in part by said frame adapted to lock said exit gate closed when said frame is in its normal position, a second exit gate for said casing disposed adjacent to the platform end of said frame, means carried in part by said frame adapted to lock said exit gate closed when the platform end of said frame is depressed, an egg pocket adapted to receive the egg laid by the fowl on said nest and to hold said egg in full view of said fowl, and means operated by the weight of said egg in said pocket adapted to trip said stop, whereby the platform end of said frame may be depressed and said egg be released.

15. A trap nest comprising a casing, a substantially horizontally disposed frame pivoted within said casing to rock about an axis disposed transversely of said frame, a nest arranged upon one side of said axis adapted to be depressed by the weight of a fowl thereon, a platform arranged upon the opposite side of said axis adapted to be depressed by the weight of a fowl on said platform, a normally open entrance gate for said casing, means operated by the depression of said nest to close said entrance gate, a movable stop disposed beneath the platform end of said frame normally adapted to prevent the depression of said platform, an exit gate for said casing, means to lock said exit gate closed when said frame is in its normal position, a second exit gate for said casing, means adapted to lock said last mentioned exit gate closed when the platform end of said frame is depressed, an egg pocket adapted to receive the egg laid by the fowl on said nest, and means operated by the weight of said egg in said pocket adapted to trip said stop, whereby the platform end of said frame may be depressed and said egg released.

In testimony whereof I have hereunto set my hand in presence of two subscribing witnesses.

RUDOLF PAULSON.

Witnesses:
SYDNEY E. TAFT,
HATTIE E. STRATTON.